United States Patent [19]

Woodward

[11] Patent Number: 5,070,445
[45] Date of Patent: Dec. 3, 1991

[54] PROGRAMMABLY CONTROLLED PARTIALLY DISTRIBUTED MASKING MECHANISM IN A PROGRAMMABLE UNIT HAVING VARIABLE DATA PATH WIDTHS

[76] Inventor: Thomas R. Woodward, 878 Westtown Rd., West Chester, Pa. 19382

[21] Appl. No.: 443,062

[22] Filed: Nov. 28, 1989

Related U.S. Application Data

[63] Continuation of Ser. No. 328,811, Mar. 23, 1989, abandoned, which is a continuation of Ser. No. 207,008, Jun. 13, 1988, abandoned, which is a continuation of Ser. No. 881,240, Jul. 2, 1986, abandoned.

[51] Int. Cl.⁵ .................. G06F 5/00; G06F 13/38
[52] U.S. Cl. ........................... 395/500; 364/259.7; 364/DIG. 1
[58] Field of Search ... 364/900 MS File, 200 MS File

[56] References Cited

U.S. PATENT DOCUMENTS

| | | | |
|---|---|---|---|
| 4,078,251 | 3/1978 | Hamilton | 364/900 |
| 4,194,241 | 3/1980 | Mager | 364/200 |
| 4,466,055 | 8/1984 | Kinoshita et al. | 364/200 |
| 4,569,016 | 2/1986 | Hao et al. | 364/200 |

*Primary Examiner*—Thomas M. Heckler

[57] ABSTRACT

A masker unit in a data processor employed to achieve programmable data path widths for the buses within the processor. A mask generator is provided to partially decode a mask amount from the currently executed control instruction and masking logic is provided with additional decoding logic to complete the mask amount decode.

6 Claims, 4 Drawing Sheets

Fig. 5

$P\langle 0 \rangle = 1$
$P\langle 1 \rangle = F\langle 0 \rangle + C\langle 0 \rangle + M\langle 4 \rangle$
$P\langle 2 \rangle = F\langle 1 \rangle + C\langle 0 \rangle + M\langle 4 \rangle$
$P\langle 3 \rangle = F\langle 2 \rangle + C\langle 0 \rangle + M\langle 4 \rangle$
$P\langle 4 \rangle = C\langle 0 \rangle + M\langle 4 \rangle$
$P\langle 5 \rangle = C\langle 0 \rangle * F\langle 0 \rangle + C\langle 1 \rangle + M\langle 4 \rangle$
$P\langle 6 \rangle = C\langle 0 \rangle * F\langle 1 \rangle + C\langle 1 \rangle + M\langle 4 \rangle$
$P\langle 7 \rangle = C\langle 0 \rangle * F\langle 2 \rangle + C\langle 1 \rangle + M\langle 4 \rangle$
$P\langle 8 \rangle = C\langle 1 \rangle + M\langle 4 \rangle$
$P\langle 9 \rangle = C\langle 1 \rangle * F\langle 0 \rangle + C\langle 2 \rangle + M\langle 4 \rangle$
$P\langle 10 \rangle = C\langle 1 \rangle * F\langle 1 \rangle + C\langle 2 \rangle + M\langle 4 \rangle$
$P\langle 11 \rangle = C\langle 1 \rangle * F\langle 2 \rangle + C\langle 2 \rangle + M\langle 4 \rangle$
$P\langle 12 \rangle = C\langle 2 \rangle + M\langle 4 \rangle$
$P\langle 13 \rangle = C\langle 2 \rangle * F\langle 0 \rangle + M\langle 4 \rangle$
$P\langle 14 \rangle = C\langle 2 \rangle * F\langle 1 \rangle + M\langle 4 \rangle$
$P\langle 15 \rangle \ \ C\langle 2 \rangle * F\langle 2 \rangle + M\langle 4 \rangle$
$P\langle 16 \rangle = M\langle 4 \rangle$
$P\langle 17 \rangle = M\langle 4 \rangle * (F\langle 0 \rangle + C\langle 0 \rangle)$
$P\langle 18 \rangle = M\langle 4 \rangle * (F\langle 1 \rangle + C\langle 0 \rangle)$
$P\langle 19 \rangle = M\langle 4 \rangle * (F\langle 2 \rangle + C\langle 0 \rangle)$
$P\langle 20 \rangle = M\langle 4 \rangle * C\langle 0 \rangle$
$P\langle 21 \rangle = M\langle 4 \rangle * (C\langle 0 \rangle * F\langle 0 \rangle + C\langle 1 \rangle)$
$P\langle 22 \rangle = M\langle 4 \rangle * (C\langle 0 \rangle * F\langle 1 \rangle + C\langle 1 \rangle)$
$P\langle 23 \rangle = M\langle 4 \rangle * (C\langle 0 \rangle * F\langle 2 \rangle + C\langle 1 \rangle)$
$P\langle 24 \rangle = M\langle 4 \rangle * C\langle 1 \rangle$
$P\langle 25 \rangle = M\langle 4 \rangle * (C\langle 1 \rangle * F\langle 0 \rangle + C\langle 2 \rangle)$
$P\langle 26 \rangle = M\langle 4 \rangle * (C\langle 1 \rangle * F\langle 1 \rangle + C\langle 2 \rangle)$
$P\langle 27 \rangle = M\langle 4 \rangle * (C\langle 1 \rangle * F\langle 2 \rangle + C\langle 2 \rangle)$
$P\langle 28 \rangle = M\langle 4 \rangle * C\langle 2 \rangle$
$P\langle 29 \rangle = M\langle 4 \rangle * C\langle 2 \rangle * F\langle 0 \rangle$
$P\langle 30 \rangle = M\langle 4 \rangle * C\langle 2 \rangle * F\langle 1 \rangle$
$P\langle 31 \rangle = M\langle 4 \rangle * C\langle 2 \rangle * F\langle 2 \rangle$

PROGRAMMABLY CONTROLLED PARTIALLY DISTRIBUTED MASKING MECHANISM IN A PROGRAMMABLE UNIT HAVING VARIABLE DATA PATH WIDTHS

This application is a continuation, of application Ser. No. 07/328,811, filed Mar. 23, 1989, which is a continuation of co-pending application Ser. No. 07/207,008 filed on June 13, 1988, now abandoned, which is a continuation of co-pending application Ser. No. 881,240 filed on July 2, 1986, now abandoned.

RELATED U.S. PATENT APPLICATIONS

U.S. patent applications directly or indirectly related to the present application are:

Ser. No. 656,247, filed Oct. 1, 1984, by Thomas R. Woodward, et al., and entitled "Programmable Data Path Width in a Programmable Unit Having Plural Levels of Subinstruction Sets".

BACKGROUND OF THE INVENTION

1. Field of the Invention

This invention relates to a programmable partially distributed masking mechanism and more particularly to such a mechanism which can be programmably set to accommodate data segments having formats of different data path widths.

2. Description of the Prior Art

The proliferation in recent years of microprocessors, i.e., a data processor on a single integrated circuit chip, has accommodated ever increasing applications of such microprocessors in intelligent terminals, personal computers and the like. Furthermore, increasing advances in the integrated circuit field have allowed such microprocessors to be designed with increasingly greater numbers of gates per chip thus resulting in microprocessors of increasing power or throughput. Originally, the first microprocessors has 8 bit wide data path widths. The next generation of microprocessors had 16 bit wide data path widths and now microprocessors with 32 bit wide data path widths are becoming readily available in the commercial market.

A feature almost inherent in such microprocessors and one that has facilitated their design on single integrated circuit chips has been that of microprogramming or microprogram control. The term "microprogram" was first coined by Maurice Wilkes in his paper "The Best Way to Design an Automated Calculating Machine", Report of the Manchester University Computer Inaugural Conference, Manchester, England, July 1951, pp 16-18. This concept did not really become practical until the advent of the first integrated circuits which had only a few gates per chip. Those initial circuits are now referred to as small scale integrated circuits (SSI). A second generation of such chips with a greater number of chips are now known as medium scale integrated circuits (MSI) and today such circuits employing many thousands of gates are available and referred to as very large scale integrated circuits (VLSI). It is this vast increase in the number of gates per chip that has allowed for the more powerful microprocessors currently available with the resulting increase in size in the microprogram stores employed in order to handle all of the sequences of microinstructions required to control such powerful microprocessors.

A particular concept that has helped to reduce the number of microinstructions to be stored has been that of two levels of control stores where the lower level contains only each unique microinstruction rather than sequences of such microinstructions which were redundant. A smaller memory in terms of word or instruction widths was supplied to contain a sequence of encoded microinstructions which served to address the corresponding lower level microinstructions. Such a system is described in the Faber et al. U.S. Pat. No. 3,983,539. In such a system, the lower level control store could be a read only memory, which is cheaper than a random access memory, while the upper level memory would be a random access memory. To distinguish the shorter vertical microinstructions in the upper level memory and the longer horizontal microinstructions in the lower level memory, the upper level memory was called the micromemory and the inventors of the Faber patent called the lower level memory a nanomemory and the horizontal microinstructions which may be just one or more fields of unencoded control bits, were called nanoinstructions.

A particular family of microprocessors employing such a two-level control store is disclosed in the Tredennick et al. U.S. Pat. No. 4,342,078.

As such microprocessors have increased in power or throughput through the increased width of their data paths from 8 to 16 and now 32 bits, data formatted for the smaller sized microprocessors cannot be readily accommodated by the processors with larger data path widths due to problems in the arithmetic unit such as when to generate a carry signal, etc., in the adder and also in the barrel switch or shifting mechanism which is employed to shift data either right or left and is also able to accommodate shifting end around or end off for different data formats. A masking mechanism is provided to, inter alia, mask off that portion of the data bus when a small data format is being employed.

Data and control buses used to interconnect functions of a processor implemented within a single integrated circuit occupy space on that integrated circuit. A reduction in the size of these buses allows a reduction in the size and therefore the cost of the integrated circuit.

It is then an object of the present invention to provide an improved masking mechanism that can accommodate different data formats under program control.

It is still another object of the present invention to provide an improved masking mechanism for the simulation of a processor having different data path widths.

It is still a further object of the present invention to provide an improved masking mechanism where the different data segments have different widths.

SUMMARY OF THE INVENTION

In order to accomplish the above-identified objects, the present invention resides in a data processor under control of a two-level control store which processor has a programmably controlled data path width therein and employs a masker to mask off those most significant bits of the internal data buses when the processor is being used in a mode where the data buses are of less width than their physical widths. The masker is partially distributed in that a mask generator is provided to partially decode the mask amount and the masking logic is provided with additional decoding logic to complete the mask amount decode.

The present invention then resides in a microprogrammable processor having programmable data path widths therein with a partially distributed masking unit to mask off those most significant bits not employed when the processor is in a mode employing data widths which are less than the physical width of the data buses therein.

BRIEF DESCRIPTION OF THE DRAWINGS

The above and other objects, advantages and features of the present invention will become more readily apparent from the following specification when taken in conjunction with the drawings wherein:

FIG. 5 is a table illustrating the logic of the various masking cells of the present invention.

GENERAL DESCRIPTION OF THE INVENTION

The present invention is employed in the environment of the processor described in the above-identified Woodward et al. application and employs a two-level control store where the higher level control store contains a sequence of microinstructions for addressing the lower level control store which contains a unique set of nanoinstructions as was described above. In addition, the higher level control store can also supply nanoinstructions to the control register of the processor so as to provide an unlimited number of nanoinstructions or control words for execution by that processor so as not to limit the number of functions that the processor can execute.

Figure 1:
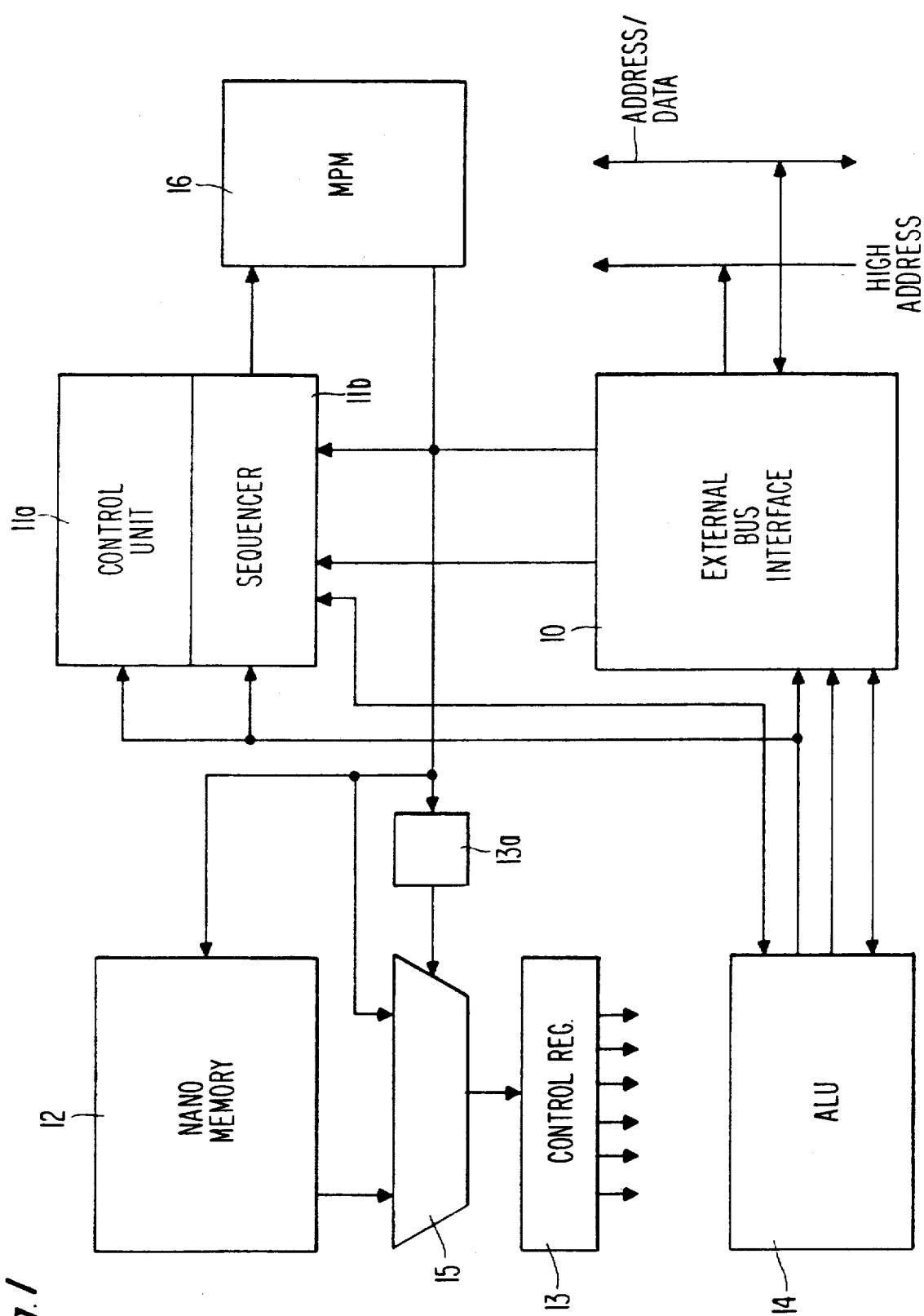
FIG. 1 is a diagram of a processor employing the present invention.

The processor of the Woodward et al. application in which the present invention resides is illustrated in FIG. 1 and includes external bus interface 10 which can address an external main memory (not shown) by way of the high address bus and the address/data bus, the latter of which is a bidirectional bus. The processor receives data and machine instructions from that main memory. The external bus interface sends portions of machine instruction operators to sequencer 11B. Sequencer 11B uses those operators to address micromemory 16 which in practice is not a part of the integrated circuit chip that contains the remaining functional elements of FIG. 1. In response thereto, microinstructions are received which are returned to control unit 11a, and other units, with the portion thereof being used as an address to nanomemory 12. As was indicated above, one type of such microinstruction might be a nanoinstruction which is supplied directly to control register 13. Whether the nanoinstruction comes from nanomemory 11 or from micromemory 16, its various fields as they reside in the control register 13 are then sent to arithmetic logic unit 24 and the other functional units of the processor to effect a particular operation. For a more complete description of the processor of FIG. 1, reference is made to the above-identified Woodward et al. application which is incorporated herein by reference.

Figure 2:
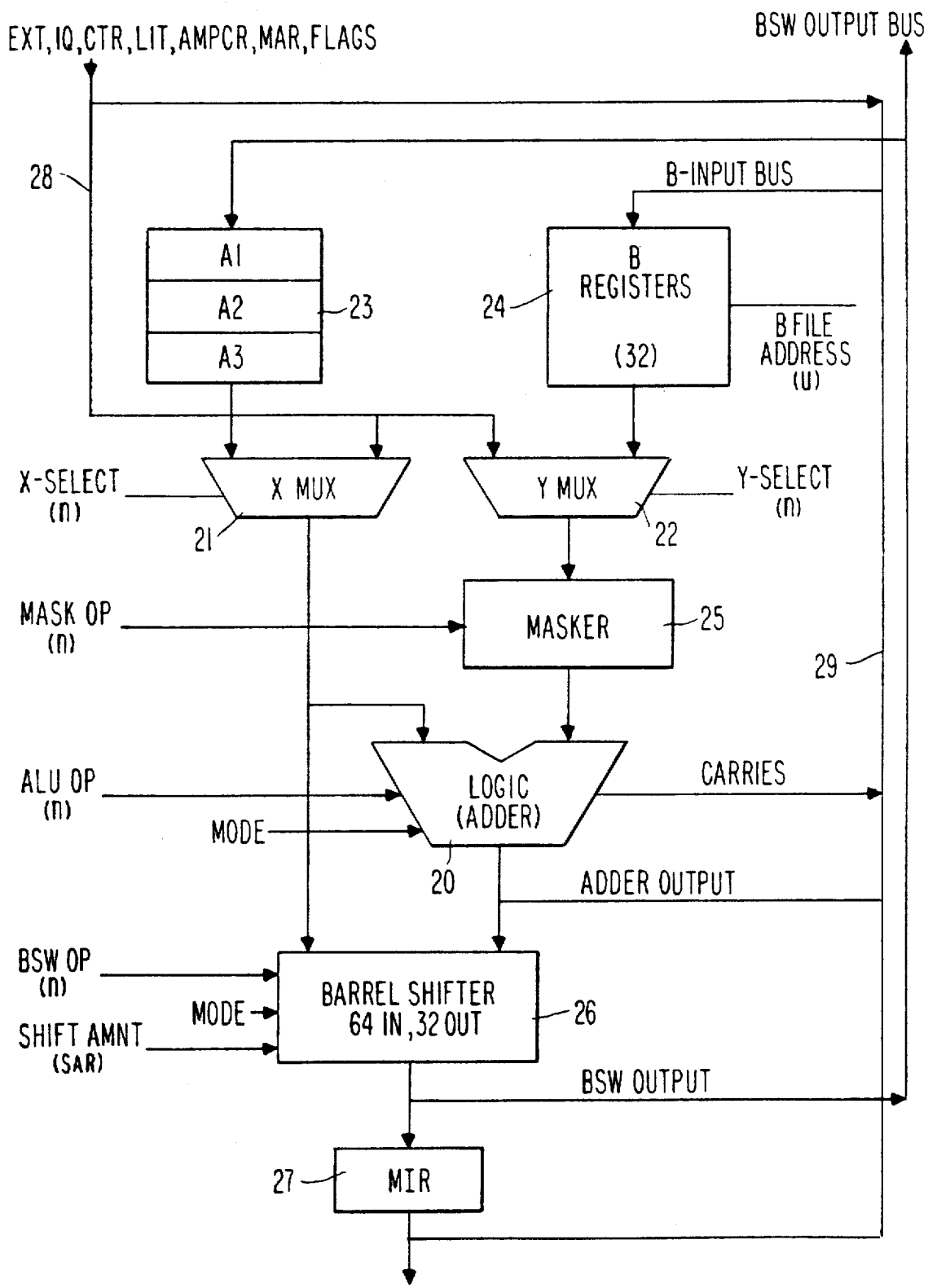
FIG. 2 is a schematic diagram of the airthmetic logic unit of the processor employing the present invention.

The shifting mechanism of the present invention resides in the arithmetic logic unit 14 of FIG. 1 which is shown in more detail in FIG. 2. As illustrated therein, logic unit 20 can receive data inputs from a variety of sources, designed as bus 28 or A register file 23 and the B register file 24 by way of X multiplexor 21 and Y multiplexor 22 respectively. The output of the Y multiplexor 22 is supplied to logic unit 20 by way of masking unit 25. The output of logic unit 20 as well as the output of X multiplexor 21 are supplied to barrel shifter 26. As was explained above, barrel shifter 26 can shift left or right end around by any number of bit positions as determined by the shift amount value specified by the current content of a Shift Amount Register (SAR). The output of barrel shifter 26 is supplied to memory information register 27 and also to barrel shifter output bus (BSW) 29 for transmission either to external bus interface 10 of FIG. 1 and also control unit 11a and sequencer 11b of FIG. 1.

As indicated in FIG. 2, barrel shifter 26 receives a shift amount value from the SAR and also a barrel switch operation code from the currently executed nanoinstruction as described in the above referred to Woodward et al. application. This barrel switch operation essentially specifies whether the shifter is to shift left or right, end off or to shift end around. The shift amount specified for left shifts must be the two's complement of the desired shift amount. In addition, barrel switch 26 receives a mode code specifying whether or not the data format being received by the barrel shifter is an 8 bit format, 16 bit format or a 32 bit format. In order to accommodate these various formats, all of the data path widths in the arithmetic logic unit of FIG. 2 are 32 bits wide.

As distinct from barrel shifter 26, masker 25 of FIG. 2 does not require a mode code. Since the masker is right-justified, the width of the data segment allowed to pass through the masker is just specified by the mask amount received from the currently executed nanoinstruction.

Figure 3:
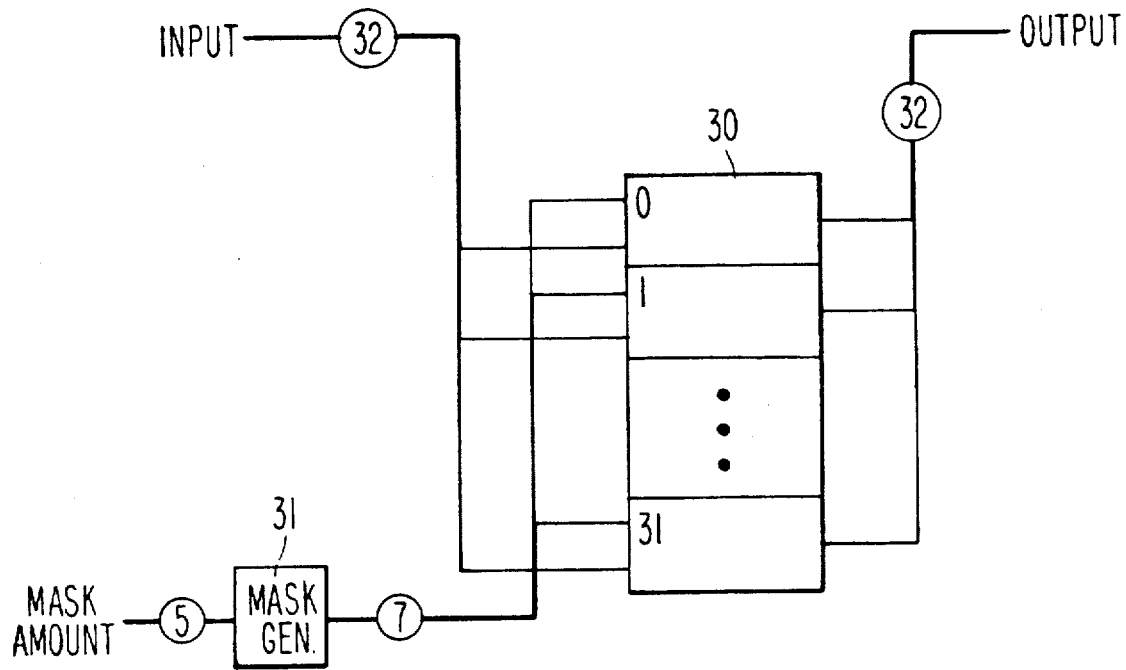
FIG. 3 is a diagram of the masking mechanism employed in the present invention.

Masker 25 of FIG. 2 is illustrated generally in FIG. 3 and includes masking logic 30 and a mask generator 31, the latter of which receives a 5-bit mask amount from the nanoinstruction currently being executed. (Again, this mask amount could come from a microinstruction). Masking logic 30 includes 32 mask cells, one for each of the 32-bit input and provides a 32-bit output for the embodiment of the present invention. If mask generator 31 were not provided, then each cell of masking logic 30 would have to contain sufficient logic to decode the 5-bit mask amount in order to generate the enable bit for that cell to achieve an output. Such a fully distributed masking logic would require an associated increase in the amount of chip area required and increased power consumption as compared to the approach of having a separate mask generator 31.

On the other hand, a fully centralized masking logic would be one in which each masking cell is simply an AND gate to receive a particular significant bit of the masker input and also an enable signal from mask generator 31. In this case, mask generator 31 must generate 32 separate enable signals, one for each of the 32 masking cells. It is to be remembered that the masking unit is right-justified so if no data segments are to be passed by the masker, the output of mask generator 31 would be 32 bits of zeros; 000, . . . ,000; if the least significant bits of input data is to be passed, the output of mask generator 31 would be 000, . . . ,001; if the least two significant bits of input data is to be passed by the masker, the output of mask genertor 31 would be 000 , . . . ,011 and so on. Mask generator 31 is of such a nature as to store respective output signals and may be a ROM, RAM or a programmable logic array (PLA).

With such a centralized logic, the output bus from mask generator 31 must be 32 bits as must be the masker input bus and the masker output bus. Thus, the additional widths of the buses increase the amount of space required on the integrated circuit chip and, to reduce the space requirement, the present invention employs a partially distributed masking logic.

DETAILED DESCRIPTION OF THE INVENTION

Figure 4:
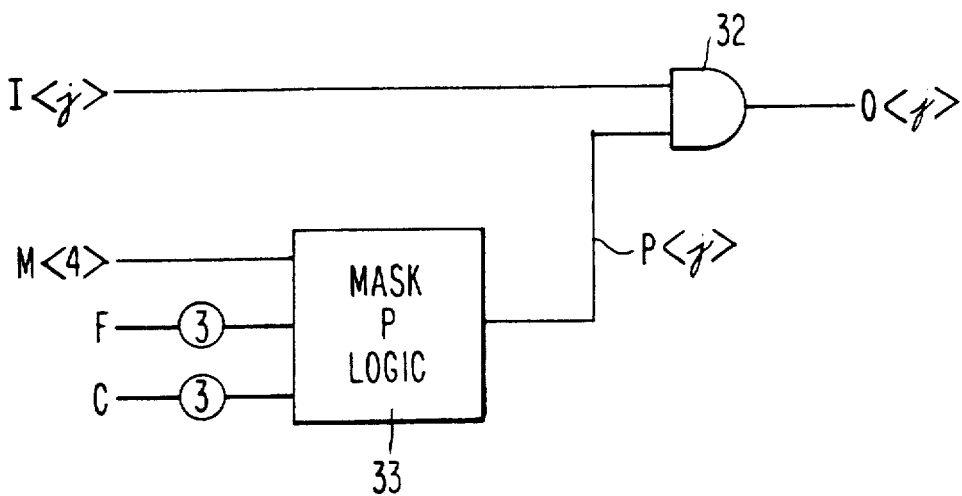
FIG. 4 is a schematic diagram of the masking logic cell of the present invention.

The masking logic of the present invention is more complex than the simple AND gate described above in relation to a centralized logic system since, in the present invention, the masking logic must perform some logic functions on the partially decoded mask signals received from mask generator 31 of FIG. 2. However, this logic is not as complex as that required for a fully distributed decoding system. In the present invention, each masking cell of masking logic 30 is as shown in FIG. 4 and each cell receives seven signals from mask generator 31. These seven signals from mask generator 31 are divided into two groups of three with the seventh output simply being the most significant bit of the mask amount M[4]. The first group of the three output signals F[2:0] is the "Fine-grain" mask amount and is decoded from the two least significant bits of the mask amount M[1:0]. The other group of three outputs C[2:0] is the "Coarse-grain" mask amount and is decoded from the two bits next to the most significant bit of the mask amount, namely M[3:2].

These outputs from mask generator 31 are used so that the most significant bit M[4] controls the passage of data through the upper or lower 16-bit halves of the masking logic and their respective input bits I. The "Coarse-grain" mask amount C[2:0] in conjunction with M[4] enables the passage of data through complete 4-bit groups within one of the 16-bit sections and the "Fine-grain" mask amount F[2:0] in conjunction with one of the "Coarse-grain" bits and M[4] controls passage of data within a particular 4-bit group. The equations which define F[2:0] and C[2:0] are:

$$C[2] = M[3] \cdot M[2]$$
$$C[1] = M[3]$$
$$C[0] = M[3] + M[2]$$
$$F[2] = M[1] \cdot M[0]$$
$$F[1] = M[1]$$
$$F[0] = M[0] + M[0]$$

The masker logic 30 of FIG. 3 is divided into 32-bit cells where each cell receives one bit of input and generates the corresponding bit of output. Each of these cells includes an AND gate and also different logic for decoding the seven input signals from mask generator 31 M[4], C[2:0] and F[2:0] generate the enabling signal to its corresponding AND gate allowing passage of the input bit.

In FIG. 4, this AND gate 32 receives its corresponding input bit I[j] and generates an output bit O[j] when it also receives an enabling bit P[j] from its corresponding masker logic P generator 33 that in turn receives the seven output signals from mask generator 31 of FIG. 3. The logic in masker logic P generator 33 for each of the corresponding significant bits is made up of AND and OR gates according to the corresponding logic equations in the table of FIG. 5. Each of those equations can readily be implemented with simple AND and OR gates as described above. Furthermore, the pattern of connections from M[4], C[2:0] and F[2:0] are all very regular. Both of these factors improve the quality of the implementation of this masker unit in very large scale integrated circuits (VLSI).

EPILOGUE

A masker unit and data processor employing this masker unit to achieve programmable data path widths for the buses within the processor have been described. The masker is partially distributed in that a mask generator is provided to partially decode a mask amount from the currently executed control instruction and the masking logic is provided with additional decoding logic to complete the mask amount decode.

While but one embodiment of the present invention has been described, it will be apparent to those skilled in the art that various modifications and variations may be made therein without departing from the spirit and scope of the invention as claimed.

What is claimed is:

1. A processing system comprising:
   an arithmetic logic unit having a plurality of function units; and
   a control store coupled to said arithmetic logic unit to supply control instructions thereto;
   said arithmetic logic unit including data buses coupling said function units together to form said system, said data buses being n-bits wide, said arithmetic logic unit also including means coupled to said control store for producing a mask signal in response to a control instruction provided by said control store, said mask signal being indicative of whether all of the bits of said buses or only m bits are to be used in response to said control instruction from said control store where m is less than n;
   said arithmetic logic unit including masking means responsive to said mask signal and coupled between two of said buses to block the passage of n-m bits of said data buses are to be used;
   said masking means including a plurality of bit cells, one for each of said n bits of said data buses, and a mask generator coupled to said bit cells and to said control store to receive a mask amount specifying those bits of said data buses that are to be blocked from passing through said bit cells, said mask generator being a memory means having sets of signals to partially decode the mask amount received from said control store.

2. A system according to claim 1 wherein:
   each of said bit cells includes masking logic to receive the partially decoded mask amount and generate an enable signal in response thereto.

3. A system according to 2 wherein:
   each of said bit cells includes and AND gate coupled to one of the bit lines of a data bus to receive an input signal, said AND gate also being coupled to its corresponding masking logic to receive an enable signal in order to generate an output signal.

4. A system according to claim 3 wherein:
   said masking logic in each of said bit cells is formed of one or more logic gates.

5. A processing system according to claim 1, wherein:
   said sets of signals comprise a coarse-grain mask amount and a fine-grain mask amount.

6. A processing system according to claim 5, wherein:
   each of said bit cells includes masking logic responsive to said coarse-grain mask amount and said fine-grain mask amount for controlling the passage of data there through.

* * * * *